United States Patent
Peteri (10) Patent No.: US 11,098,809 B1
(45) Date of Patent: Aug. 24, 2021

(54) MIXING TAP FOR DISPENSING WATER

(71) Applicant: Quooker International B.V., Ridderkerk (NL)

(72) Inventor: Niels Theodoor Peteri, Rotterdam (NL)

(73) Assignee: Quooker International, B.V., Ridderkerk (NL)

( * ) Notice: Subject to any disclaimer, the term of this patent is extended or adjusted under 35 U.S.C. 154(b) by 0 days.

(21) Appl. No.: 16/069,226

(22) PCT Filed: Jan. 11, 2017

(86) PCT No.: PCT/NL2017/050012
§ 371 (c)(1),
(2) Date: Jul. 11, 2018

(87) PCT Pub. No.: WO2017/123087
PCT Pub. Date: Jul. 20, 2017

(30) Foreign Application Priority Data

Jan. 11, 2016 (NL) ...................................... 2016083

(51) Int. Cl.
*F16K 11/085* (2006.01)
(52) U.S. Cl.
CPC ... *F16K 11/0856* (2013.01); *Y10T 137/87579* (2015.04); *Y10T 137/9464* (2015.04)
(58) Field of Classification Search
CPC .................. F16K 31/02; F16K 11/0856; Y10T 137/9464; Y10T 137/87579; E03C 1/0404; E03C 1/0403; E03C 2201/40
USPC ....................................................... 137/801
See application file for complete search history.

(56) References Cited

U.S. PATENT DOCUMENTS

| 5,758,690 | A | * | 6/1998 | Humpert | E03C 1/0404 |
| | | | | | 137/801 |
| 6,029,699 | A | * | 2/2000 | Granot | E03C 1/04 |
| | | | | | 137/565.12 |
| 6,390,125 | B2 | * | 5/2002 | Pawelzik | F16K 11/0782 |
| | | | | | 137/605 |
| 9,772,040 | B2 | * | 9/2017 | Liu | F16K 11/0787 |
| 10,066,375 | B2 | * | 9/2018 | Kostorz | E03C 1/0403 |
| 2007/0235091 | A1 | | 10/2007 | Granot | |
| 2014/0026980 | A1 | * | 1/2014 | Esche | E03C 1/0404 |
| | | | | | 137/315.01 |
| 2014/0069520 | A1 | | 3/2014 | Esche et al. | |
| 2014/0251071 | A1 | * | 9/2014 | Ben-Dor | G05G 1/04 |
| | | | | | 74/523 |

(Continued)

FOREIGN PATENT DOCUMENTS

WO 2010/130200 A1 11/2010

*Primary Examiner* — Jessica Cahill
(74) *Attorney, Agent, or Firm* — Hoffmann & Baron, LLP (57) ABSTRACT

A mixing tap for dispensing water includes a tap body having a fitting end for fitting the tap body in or on a fitting opening, an spout fitted in or on the tap body and provided with a dispensing end, a mixing device arranged in the tap body. The mixing device includes a first inlet for cold water, a second inlet for hot water and an outlet for mixed water, and a hose having a nozzle. The mixing tap has an accommodation duct which runs from the fitting end to the dispensing end for receiving at least a portion of the hose. The hose is displaceable with respect to the spout between a pulled-out position, in which the hose protrudes with respect to the dispensing end, and a normal position, in which the hose does not extend with respect to the dispensing end or to a lesser degree.

14 Claims, 5 Drawing Sheets

(56) References Cited

U.S. PATENT DOCUMENTS

| | | | |
|---|---|---|---|
| 2015/0076252 A1* | 3/2015 | Peteri | E03C 1/0404 |
| | | | 239/428.5 |
| 2015/0368888 A1 | 12/2015 | Song et al. | |
| 2017/0101325 A1* | 4/2017 | Ye | B01D 35/046 |

* cited by examiner

MIXING TAP FOR DISPENSING WATER

CROSS-REFERENCE TO RELATED APPLICATIONS

This application is the National Stage of International Application No. PCT/NL2017/050012, filed Jan. 11, 2017, which claims the benefit of Netherlands Application No. NL 2016083, filed Jan. 11, 2016, the contents of which is incorporated by reference herein.

FIELD OF THE INVENTION

The invention relates to a mixing tap for dispensing water, in particular to a mixing tap with a pull-out nozzle.

BACKGROUND OF THE INVENTION

Mixing taps are used for dispensing mixed water. Such a mixing tap comprises a mixing device for dispensing mixed water. The mixing device comprises a first inlet for cold water, a second inlet for hot water and an outlet. By operating the mixing device, a desired ratio of hot and cold water can be set and a desired amount of mixed water can be dispensed to the outlet. Depending on the setting of the mixing device, the mixed water may be a mixture of cold and hot water, but may also be all cold water or all hot water.

The mixing device may have a single operating element to set both the volumetric flow of the mixed water and the mixing ratio between hot and cold water. The mixing device may also have two or more operating elements, for example one for setting the volumetric flow of cold water and one for setting the volumetric flow of hot water, thus defining the mixing ratio and the amount of mixed water.

A certain type of mixing taps is provided with a pull-out nozzle. To this end, the mixing tap comprises an at least partly flexible hose, which comprises a water conduit having an inflow end and an outflow end. The inflow end is connected to the outlet of the mixing device and the outflow end ends in a nozzle for dispensing the mixed water which is provided near a dispensing end of the spout. In this case, the mixing tap is provided with an accommodation duct for receiving at least a portion of the hose which runs from a fitting end of the tap body to a dispensing end of the spout. The hose with nozzle can be displaced with respect to the spout between a pulled-out position, in which the hose protrudes from the dispensing end, and a normal position, in which the hose does not protrude from the dispensing end or to a lesser degree.

With such a mixing tap, the hose with nozzle is thus displaceable from a normal position to a pulled-out position, in which the hose projects from the spout. Due to the flexibility of the hose, the nozzle can be swung with respect to the spout in the pulled-out position, which makes it possible to increase the reach of the water jet flowing out of the nozzle, for example in order also to reach the corners of the sink. These mixing taps are also referred to as mixing taps with pull-out aerator.

It is an object of the invention to provide an improved mixing tap for dispensing water.

SUMMARY OF THE INVENTION

The invention provides a mixing tap for dispensing water comprising:
a tap body having a fitting end for fitting the tap body in or on a fitting opening,
a spout fitted in or on the tap body and provided with a dispensing end,
a mixing device arranged in the tap body, in which the mixing device comprises a first inlet for cold water, a second inlet for hot water and an outlet for mixed water, and
an at least partly flexible hose, in which the flexible hose comprises a first water conduit with an inflow end and an outflow end, in which the inflow end is connected to the outlet and in which the outflow end ends in a nozzle provided near the dispensing end of the spout for dispensing the mixed water,
wherein the mixing tap has an accommodation duct which runs from the fitting end to the dispensing end for receiving at least a portion of the hose,
wherein the hose with nozzle is displaceable with respect to the spout between a pulled-out position, in which the hose protrudes with respect to the dispensing end, and a normal position, in which the hose does not extend with respect to the dispensing end or to a lesser degree, and
wherein the hose has a second water conduit with a second inflow end and a second outflow end, in which the second inflow end is connected to a connection for connecting a water supply conduit coming from a water source, and the second outflow end ends in the nozzle.

According to the invention, the functionality of the known mixing tap with pull-out nozzle is significantly increased by designing this type of taps for supplying an additional type of water, for example very hot or boiling water, from a single spout with pull-out nozzle.

To this end, a second water conduit is provided in the displaceable hose with nozzle for supplying and dispensing water originating from a water source. The water source may be, for example, a device for dispensing very hot or boiling water, for example water having a temperature of more than 95 degrees Celsius, or a device for dispensing cold water and/or cooled water, in which the cold water and/or cooled water is preferably filtered cold and/or cooled water. The water source may also be a water source for dispensing carbonated water.

By providing the second water conduit in the hose, the water originating from the water source which is also dispensed via the nozzle does in this case not come into contact with the water in the first water conduit, or only to a substantially smaller degree. This is particularly advantageous with water which is intended for consumption, such as very hot or boiling water and/or filtered cold or filtered cooled water, because the fresh water is not mixed with other water, in particular hot water which has been present in a boiler or the like at elevated temperature. Further, when the supply of water originating from the water source is opened, no mixed water will initially be dispensed first via the nozzle as a result of using a common water conduit for both mixed water and water originating from the water source to the nozzle of the mixing tap.

The tap body has a fitting end for fitting the tap body in or on a fitting opening. The fitting opening is, for example, an opening provided in a worktop, in which case the water supply for cold and hot water and the water supply conduit coming from the water source can be arranged under the worktop.

After the tap body has been fitted, the dispensing end of the spout is usually situated above the worktop, in particular directly above a sink arranged in the worktop. The spout may have a curved shape. Also, the spout may be pivotable with respect to the worktop, so that the dispensing end and thus the nozzle can be displaced with respect to the worktop/sink.

The mixing device may be any device provided in a tap body for mixing cold and hot water and dispensing it. The mixing device may comprise one or more operating elements with operating valves for operating the mixing device. By means of these one or more operating elements, it is possible to adjust both the volumetric flow of mixed water and the mixing ratio between the cold water and the hot water. Preferably, the mixing device comprises an operating element which is configured to adjust both the volumetric flow of mixed water and the ratio between the amount of cold water and hot water to be dispensed. Such operating elements are known per se.

The mixing tap comprises an at least partly flexible hose with a first water conduit which passes the mixed water from the outlet of the mixing device to a nozzle which is provided near the dispensing end of the spout. The nozzle is attached to the hose so that it can move together with the hose with respect to the spout. In the tap body and the spout, an accommodation duct is provided for receiving at least a portion of the hose. The hose is displaceable with respect to the spout between a pulled-out position, in which the hose protrudes with respect to the dispensing end, and a normal position, in which the hose does not protrude, or at least to a lesser degree, with respect to the dispensing end. As a result of the flexibility of the hose or at least a portion of the hose which protrudes with respect to the dispensing end in the pulled-out position of the hose, the nozzle attached to an end of the hose is pivotable with respect to the spout.

The hose may comprise various hose parts, for example a first hose part and a second hose part which is situated in line with the first hose part. The first hose part may comprise only the first water conduit and the second hose part may comprise the first and the second water conduit, with the connection connecting the water supply conduit coming from the water source being provided between the first hose part and the second hose part.

The nozzle is suitable both for dispensing mixed water from the first water conduit and the water coming from the water source from the second water conduit. To this end, the nozzle may be provided with two outflow openings.

In an embodiment, the hose is provided with a ballast element for pulling the hose with nozzle to the normal position and/or keeping the hose with nozzle in the normal position. Often it is desired to place or keep the hose and nozzle in the normal position when the mixing tap is not being used. In order to allow this to happen automatically, or at least in order to facilitate moving the hose and nozzle to the normal position, a ballast element may be provided on the hose. The ballast element, for example a relatively heavy mass which is attached to the hose, is provided to pull the hose and thus the nozzle in the direction of the normal position, or to keep the hose and nozzle in the normal position if the hose and nozzle are already in the normal position.

In an embodiment, the connection for connecting the water supply conduit coming from the water source is arranged in or near the ballast element. The ballast element is provided in order to take the hose to the normal position after it has been pulled out and to this end hangs freely in space, for example under a worktop. By providing the connection in or near the ballast element, it does not have to be provided in the tap body. This renders the tap body less complicated and makes the connection easily accessible.

Also, there is more space near or in the ballast element for providing the connection, since there is more space available than in the tap body. The connection also contributes to pulling or keeping the hose in the normal position as it provides additional ballast.

In a further embodiment, the ballast element is attached to the hose in such a manner that it is situated close, preferably as close as possible, to the fitting end of the tap body when the hose is in the pulled-out position. This makes the distance between the connection and the nozzle, i.e. the length of the second water conduit, short, so that the water can flow relatively quickly from the water source to the nozzle.

In an embodiment, the hose has a loop part and a spout part, in which the spout part extends at least partly in the accommodation duct and is connected to the nozzle and in which the loop part is connected to the outlet of the mixing device.

After fitting the tap body in an opening, for example a fitting opening provided for this purpose in a worktop, the loop part of the hose may extend under the worktop and the spout part may extend through the accommodation duct from below the worktop as far as the dispensing end of the spout. The loop part is used to facilitate movement of the spout part between the normal position and the pulled-out position.

The first water conduit runs both through the loop part and the spout part. The second water conduit runs through the spout part and may run partly through the loop part. A coupling device is provided between the loop part and the spout part to connect the portions of the first water conduit running through the loop part and the spout part to each other. If the second water conduit runs only through the spout part, the coupling device may comprise the connection for the water supply conduit of the water source. If the second water conduit runs partly through the loop part, the coupling device is also configured to connect the portions of the second water conduit running through the loop part and the spout part to each other.

In an embodiment of the device with a ballast element, the ballast element is provided between the loop part and the spout part of the hose.

In an embodiment, the connection for the water supply conduit coming from the water source is provided at a location of the hose where the hose extends in a direction, in particular in the vertical direction, wherein the connection is configured to connect the water supply conduit coming from the water source in substantially the same direction. When the hose is moved between the pulled-out position and the normal position, the ballast element will move substantially in a vertical direction as a result of the force of gravity acting on the ballast element. In order to ensure that the water supply conduit coming from the water source prevents the movement of the ballast element as little as possible, it is advantageous to configure the connection such that the water supply conduit coming from the water source is connected to the connection so as to run in a substantially vertical direction.

In an embodiment, the first water conduit and the second water conduit in the hose run concentrically with respect to each other. In this case, one of either the first water conduit or the second water conduit for example has a circular cross section and the other of the first water conduit or the second water conduit has a ring-shaped cross section arranged around the circular cross section. Due to the first water conduit and the second water conduit running concentrically, the hose has a cross section which is symmetrical with respect to the longitudinal axis. As a result thereof, the hose has substantially the same properties in different bending directions and the hose has a round outer circumference, in which a relatively large surface area of the cross section is used for the first and the second water conduit. The cross-sectional area of the hose is thus used efficiently for passing water from the respective inflow openings to the respective outflow openings.

Further, the nozzle is preferably designed to be concentric, with the nozzle having a central circular outflow opening for one of either the first water conduit or the second water conduit and a ring-shaped second outflow opening which is arranged around the circular outflow opening for the other of the first or the second water conduit.

In an embodiment, the mixing tap comprises a position sensor for determining the position of the hose with respect to the spout. In certain embodiments, it may be desirable to determine the position of the hose with respect to the spout. For example, when the water source is a source of very hot or boiling water, it may be desired to only dispense very hot or boiling water, when the hose and the nozzle are in the normal position. In order to make this possible, a position sensor may be provided to determine the position of the hose with respect to the spout and allowing very hot or boiling water to be dispensed from the water source in dependence thereof.

Such a position sensor may be any suitable sensor, such as a proximity sensor or a contact sensor. The position sensor is preferably fitted in the tap body.

In an embodiment, the mixing tap comprises an operating element for operating the dispensing of water coming from the water source by the mixing tap. It has to be possible to operate the water source for dispensing water so that it can dispense water via the second water conduit, if desired. To this end, the mixing tap may be provided with an operating element which is preferably fitted on the tap body.

In an embodiment, the operating element is configured to emit an electrical operating signal. An electrical operating signal to be emitted by the operating element can readily be used to operate a valve which can be actuated electrically and is situated at a distance, for example near the water source.

In an alternative embodiment, the operating element is mechanically connected to a valve in the second water conduit and/or in the water supply conduit of the water source to the connection, so that the dispensing of water from the water source can be controlled directly by operating the valve by means of the operating element.

In an embodiment, the operating element is an operating ring extending around the tap body. An operating ring extending around the tap body forms an optically appealing operating element which can easily be operated by a user.

The invention furthermore provides a system for dispensing water, comprising:
  a mixing tap according to any of the embodiments described herein,
  a water source for dispensing an additional type of water,
  a water supply conduit coming from the water source and connected to or intended to be connected to the connection of the mixing tap.

The additional type of water is for example very hot or boiling water, or cold water and/or cooled water, preferably filtered cold and/or cooled water. The additional type of water may also be carbonated water.

Further features and details of the invention will be explained in more detail below by means of the description of an embodiment of the invention, in which reference is made to the attached drawings.

DETAILED DESCRIPTION OF THE INVENTION

Figure 1:
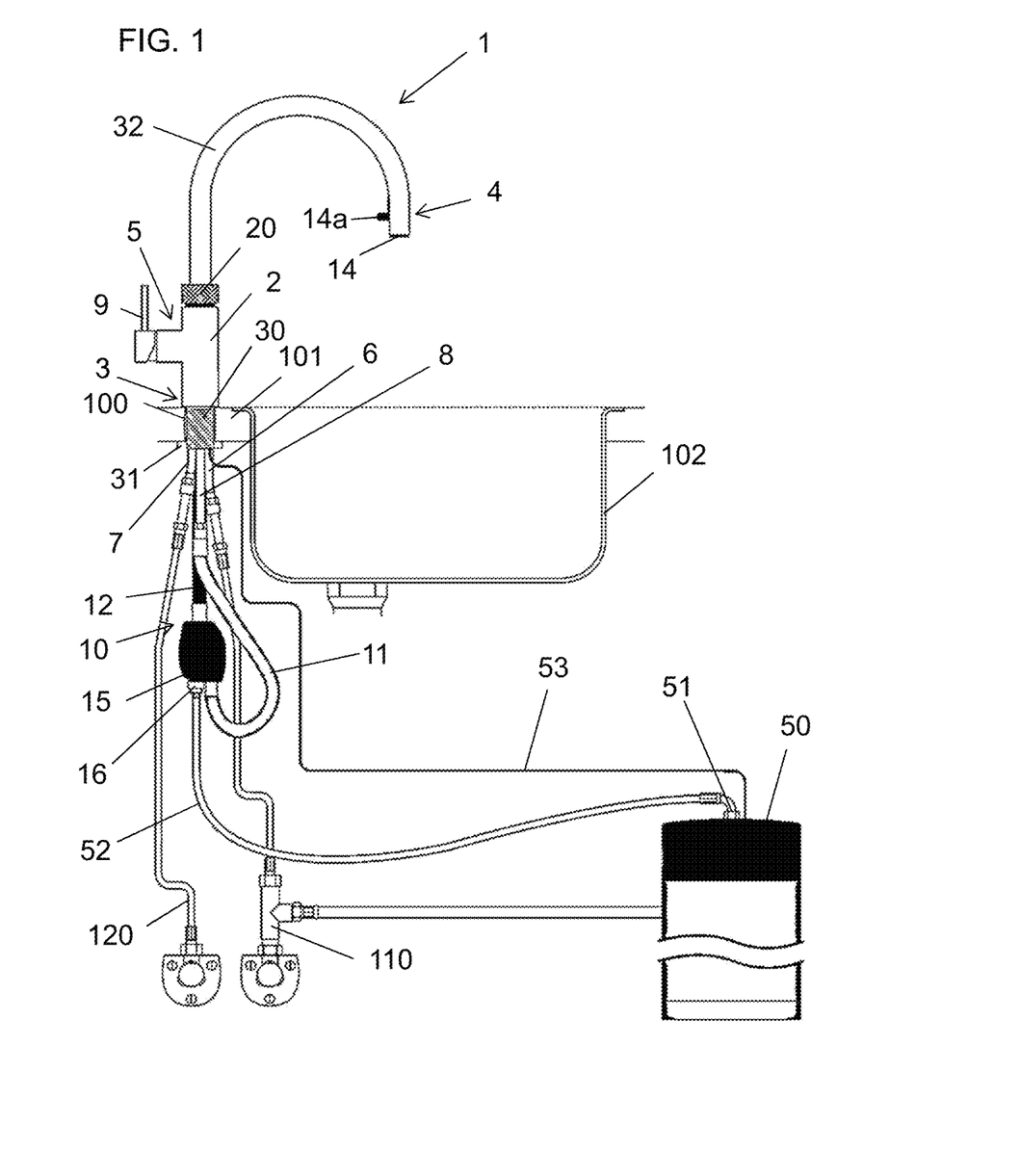
FIG. 1 shows an overall view of an embodiment for dispensing water with a hose and nozzle in the normal position.

FIG. 1 shows a mixing tap for dispensing water, generally denoted by reference numeral 1.

Figure 3:
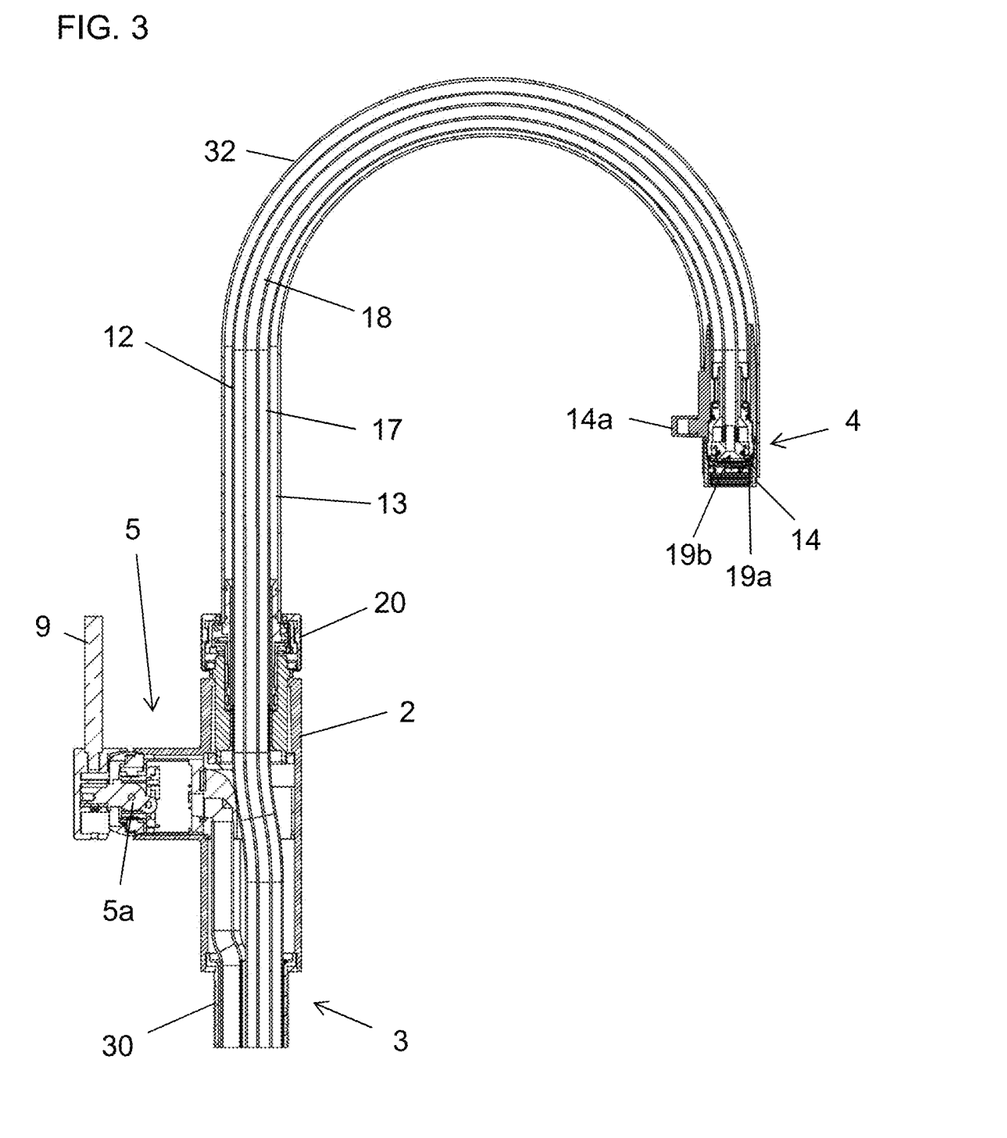
FIG. 3 shows a longitudinal section through the tap body and the spout from the embodiment of FIG. 1.

The mixing tap 1 comprises a tap body 2 with a fitting end 3 for fitting the tap body 2 in a fitting opening 100 of a worktop 101, a spout 32 and a dispensing end 4 for dispensing the water. FIG. 3 shows a cross section of the tap body.

The fitting end 3 has a threaded mounting bush 30 which is arranged in the fitting opening 100. On the underside of the worktop 101, a correspondingly threaded mounting ring 31 is fitted on the mounting bush 30 to fix the tap body 2 to the worktop 101.

The spout 32 has a curved shape so that the dispensing end 4 is situated over a sink 102 which is arranged in the worktop 101.

A mixing device 5 is arranged in the tap body 2. The mixing device 5 comprises a first inlet 6 for cold water, a second inlet 7 for hot water, and an outlet 8 for dispensing the mixed water.

The mixing device 5 comprises a mixing mechanism 5a (see FIG. 3) for mixing the cold water and the hot water. The volumetric flow of the water flow dispensed by the mixing device 5 at the outlet 8 and the ratio between the cold water and the hot water thereof can be adjusted by means of an operating element 9. Using the operating element 9, any desired ratio between cold and hot water can be set. Thus, it is also possible for the mixed water to contain only cold water or only hot water.

The first inlet 6 of the mixing device is connected to a cold-water conduit 110 and the second inlet 7 is connected to a hot-water conduit 120.

The outlet 8 is connected to an at least partly flexible hose 10 which is composed of a loop part 11, a ballast element 15, and a spout part 12 (see also FIG. 3). The loop part 11 and the spout part 12 are made, for example, of flexible plastic in order to make the hose at least partly flexible.

An end of the loop part 11 is connected to the outlet 8. The spout part 12 runs through an accommodation duct 13 which extends from the fitting end 3 of the tap body 2 to the dispensing end 4 of the spout 32. The nozzle 14 is provided at the dispensing end 4 of the spout 32 and is fixedly connected to the hose 10.

The spout part 12 of the hose 10 and nozzle 14 connected thereto are accommodated in the accommodation duct 13 so as to be displaceable, in particular slidable, between a normal position and a pulled-out position. FIG. 1 shows the spout part 12 and the nozzle 14 in a normal position, in which the nozzle 14 is largely pulled back into the spout 32.

Figure 2:
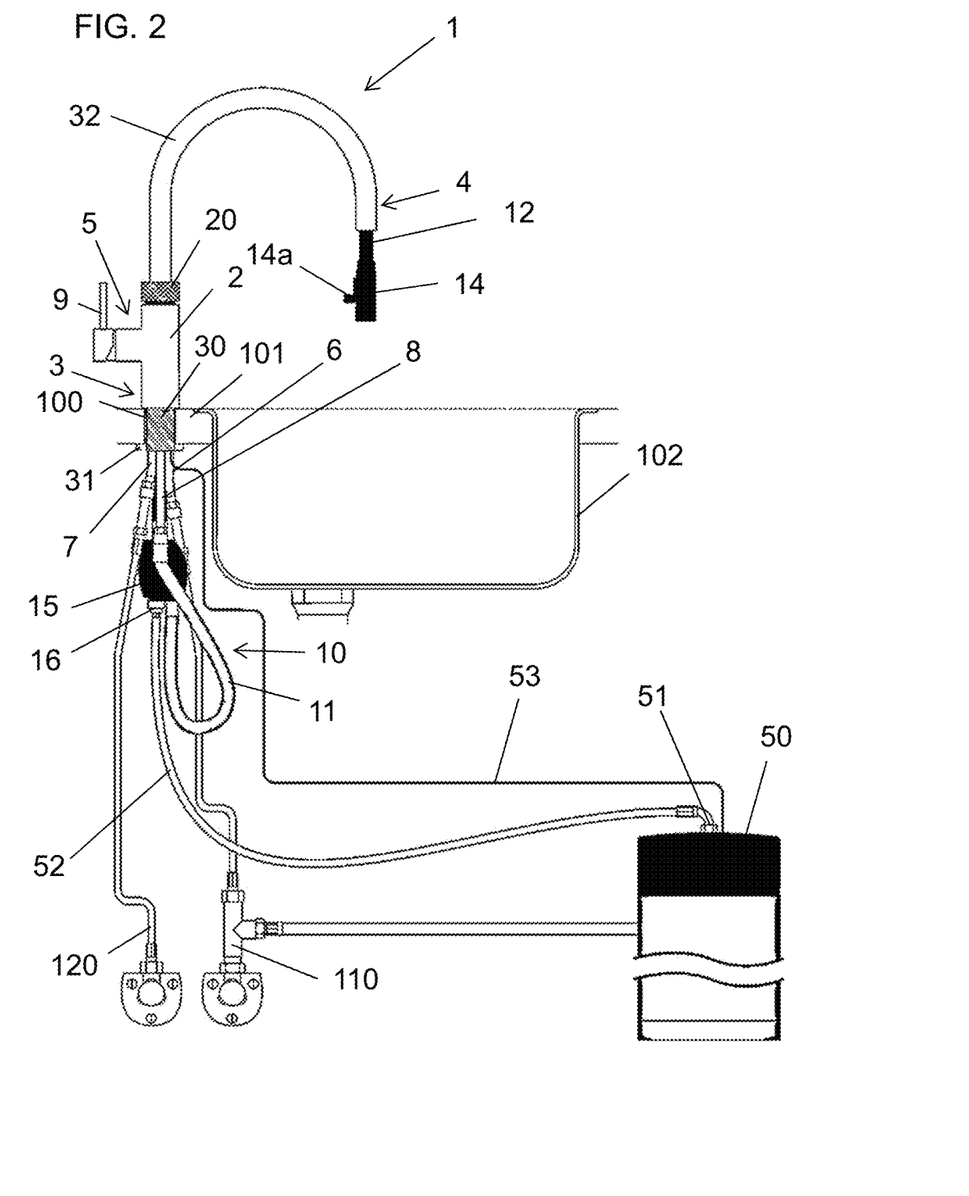
FIG. 2 shows the overall view of the embodiment of FIG. 1 with a hose and nozzle in the pulled-out position.

FIG. 2 shows the hose 10 and the nozzle 14 in the pulled-out position. Hose 10 and nozzle 14 may be moved from the normal position to the pulled-out position by manually pulling on the nozzle 14. To this end, the nozzle 14 is provided with a protruding part 14a by means of which the nozzle 14 can easily be moved downwards, out of the spout 32.

A ballast element 15 is provided between the loop part 11 and the spout part 12. The ballast element 15 is a relatively heavy element which is provided in order to exert a downward force on the spout part 12. As a result of this downward force, the hose 10 and the nozzle 14 are pulled into the normal position. This downward force may be sufficient to pull back the hose 10 with nozzle 14 automatically into the normal position, or helps to move the hose 10 and nozzle 14 into the normal position when the nozzle 14 is pushed upwards into the spout 32.

The mixing tap 1 is part of a system for dispensing water. The system furthermore comprises boiling-water device 50 for dispensing very hot or boiling water, i.e. water at a temperature equal to or higher than 95 degrees Celsius. Such a boiling-water device 50 for dispensing boiling water is known per se.

The boiling-water device 50 comprises a container in order to keep water pressurized at a temperature of more than 100 degrees Celsius. The container comprises an outlet 51 where the water may, if desired, be dispensed to a water supply conduit 52. The container is connected to the cold-water conduit 110 to fill the container with fresh water when boiling water is dispensed.

The mixing tap 1 is configured to dispense the boiling water via the nozzle 14. To this end, the ballast element 15 is provided with a connection 16, by means of which the water supply conduit 52 can be connected to the hose 10.

The loop part 11 and the spout part 12 define, see also FIG. 3, a first water conduit 17 with an inflow end which is connected to the outlet 8 of the mixing device 5 and an outflow end which is connected to the nozzle 14 to pass mixed water from the mixing device 5 to the nozzle 14 via the loop part 11 and the spout part 12.

The spout part 12 furthermore comprises a second water conduit 18 with an inflow end which is connected to the connection 16 via ballast element 15 and an outflow end which is connected to the nozzle 14 to pass very hot or boiling water from the water supply conduit 52 to the nozzle 14.

The first water conduit 17 thus runs through the loop part 11 and the spout part 12 and the second water conduit 18 runs only through the spout part 12. In the spout part 12, the first water conduit 17 and second water conduit 18 run concentrically with respect to each other, with the second water conduit 18 having a circular cross section and the first water conduit 17 a ring-shaped cross section surrounding the former.

The nozzle 14 is provided with a common aerator, in which the second water conduit 18 ends in a circular outflow opening 19b and the first water conduit 17 in a ring-shaped outflow opening 19a surrounding the former. Any other suitable configuration of the first and second water conduit and associated outflow openings can also be used.

An electrical operating element 20 for operating the boiling-water device 50 for dispensing boiling water is provided on the tap body 2. The operating element 20 is connected to a valve (not shown) of the boiling-water device 50 by means of an electrical operating connection 53. By pushing down and/or turning the operating element 20, the boiling-water device 50 can thus be actuated to dispense boiling water via the water supply conduit 52.

Figure 4:
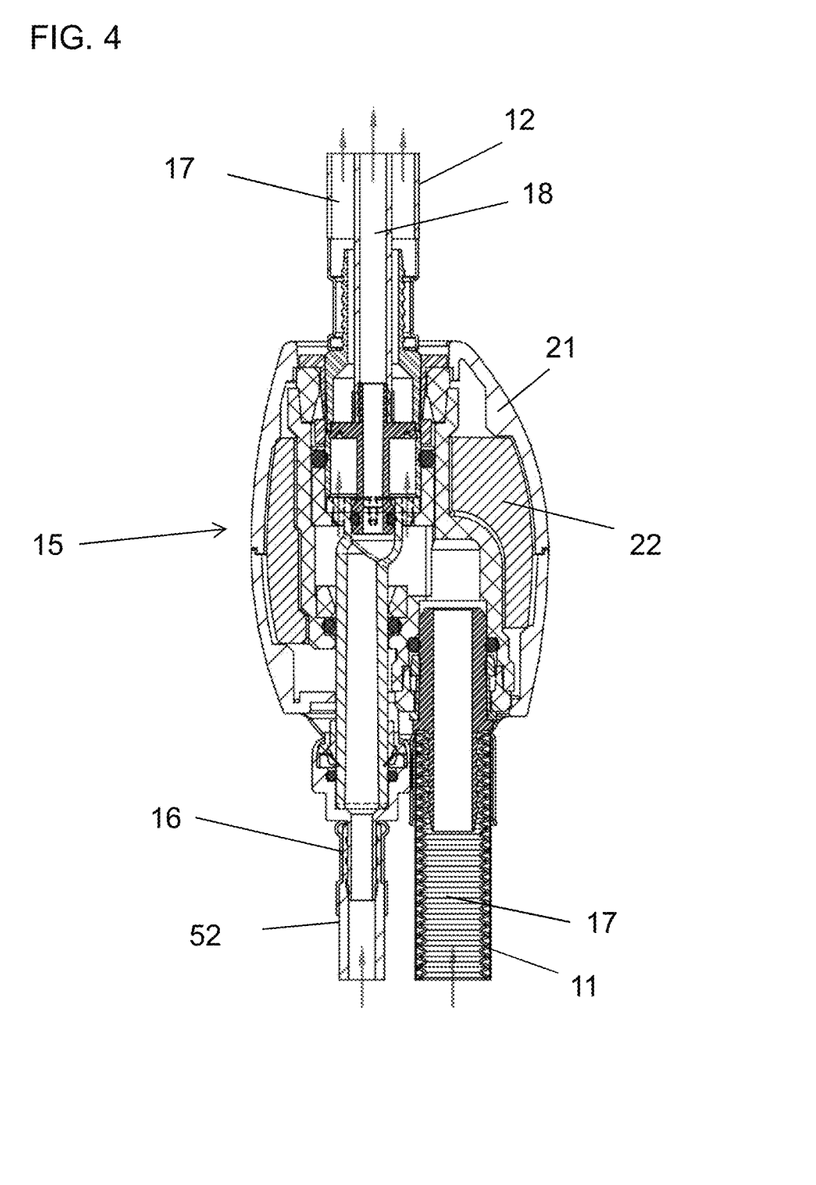
FIG. 4 shows a cross section of the hose from the embodiment of FIG. 1 at the ballast element and the connection for connecting a water supply conduit coming from a water source.

FIG. 4 shows a cross section of the ballast element 15. A ballast mass 22, for example made of metal, is provided in a housing 21 of the ballast element 15 to give the ballast element 15 a desired mass for exerting a downward force on the hose 10.

FIG. 4 shows how the water supply conduit 52 is attached to the connection 16 in the same vertical direction as that in which the loop part 11 and the spout part 12 extend at the ballast element 15. This significantly reduces the risk of blocking the movement of the loop part 11 and the ballast element 15 due to the presence of the connection 16 and the water supply conduit 52 attached thereto.

The ballast element 15 is furthermore configured to allow the mixed water from the water conduit 17 in the loop part 11 and the boiling water from the water supply conduit 52 to flow in such a manner that, in the spout part 12, the boiling water will flow centrally in the second water conduit 18 and the mixed water will flow in the concentric first water conduit 17 surrounding it.

Figure 5:
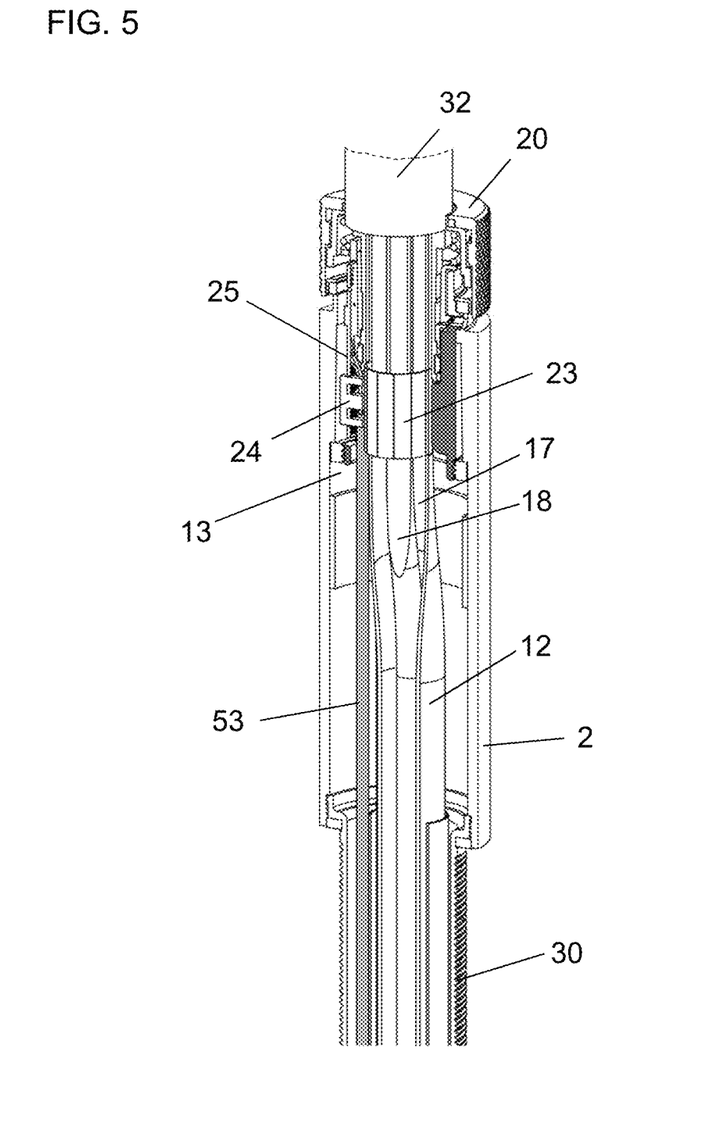
FIG. 5 shows a detail view of a cross section of the tap body from FIG. 3.

FIG. 5 shows a cross section of a portion of the tap body 2. A ring 23 made of an electrically conductive material is fitted around the spout part 12 of the hose 10. This ring 23 is detectable by means of a sensor 24 which is fitted to a control unit 25. The sensor 24 is configured to detect the presence of the electrically conductive ring 23 via an electromagnetic field.

The control unit 25 is configured to send an operating signal to the boiling-water device 50 via the operating connection 53 when the operating element 20 is being operated in order to cause boiling water to be dispensed. In addition, control unit 25 sends the signal from sensor 24 to boiling-water device 50.

In FIG. 5, the hose 10, in particular the spout part 12 thereof, is shown in the normal position. When the spout part 12 is moved to the pulled-out position, the ring 23 and the spout part 12 will move upwards through the accommodation duct 13 and will not, or in another way, be detectable by the sensor 24. By means of sensor 24, it is thus possible to determine whether the hose 10 is in the normal position or the pulled-out position.

Because the nozzle 14 is pulled out of the spout 32 by hand, it may be undesirable for boiling water to be dispensed when the nozzle is not in its normal position. To this end, the position determination of the hose 10 by means of the sensor 24 can be used. In this case, the control unit 25 will only send an operating signal to the boiling-water device 50 via the operating connection 53, for example when the operating element 20 is being operated, if the sensor 24 has detected that the ring 23 is in the position shown in FIG. 5, i.e. the normal position.

It will be clear to those skilled in the art that any other position sensor which is suitable to determine the position of the hose 10 with respect to the spout 32 can also be used to dispense boiling water only if the hose 10 and the nozzle 14 are in the normal position.

In the illustrated embodiment, the mixing tap with pull-out nozzle is combined with the boiling-water device 50 for dispensing boiling water. In an alternative embodiment, the mixing tap with pull-out nozzle can also be connected to a water source with, preferably filtered, cooled or cold water and/or with carbonated water. In such an embodiment, this water source may be connected to the mixing tap in a similar way in which the boiling-water device 50 is connected to the connection 16.

The invention claimed is:

1. A mixing tap for dispensing water, comprising:
   a tap body having a fitting end for fitting the tap body in or on a fitting opening,
   a spout fitted in or on the tap body and provided with a dispensing end,
   a mixing device arranged in the tap body, in which the mixing device comprises a first inlet for cold water, a second inlet for hot water and an outlet for mixed water, and
   an at least partly flexible hose, in which the flexible hose comprises a first water conduit with an inflow end and an outflow end, in which the inflow end is connected to the outlet and in which the outflow end ends in a nozzle provided near the dispensing end of the spout for dispensing the mixed water,
   wherein the mixing tap has an accommodation duct which runs from the fitting end to the dispensing end for receiving at least a portion of the hose,
   wherein the hose with nozzle is displaceable with respect to the spout between a pulled-out position, in which the hose protrudes with respect to the dispensing end, and a normal position, in which the hose does not extend with respect to the dispensing end or to a lesser degree than in the pulled-out position,
   wherein the hose has a second water conduit with a second inflow end and a second outflow end, in which the second inflow end is connected to a connection for connecting a water supply conduit coming from a water source, and the second outflow end ends in the nozzle,
   wherein the mixing tap comprises an operating element for operating the dispensing of water coming from the water source by the mixing tap,
   wherein the operating element is configured to emit an electrical operating signal to operate a valve that can be actuated electrically,
   wherein the hose is provided with a ballast element for pulling the hose with nozzle to the normal position and/or keeping the hose with nozzle in the normal position
   wherein the connection for connecting the water supply conduit coming from the water source is arranged in or near the ballast element,
   wherein the hose has a loop part and a spout part, in which the spout part extends at least partly in the accommodation duct and is connected to the nozzle and in which the loop part is connected to the outlet of the mixing device, and
   wherein the ballast element is provided between the loop part and the spout part of the hose.

2. The mixing tap according claim 1, wherein the connection is provided at a location of the hose where the hose extends in a direction, and wherein the connection is configured to connect the water supply conduit coming from the water source in substantially the same direction.

3. The mixing tap according to claim 2, wherein the direction is substantially vertical in the fitted position of the mixing tap.

4. The mixing tap according to claim 1, wherein the first water conduit and the second water conduit in the hose run concentrically with respect to each other.

5. The mixing tap according to claim 1, wherein the mixing tap comprises a position sensor for determining the position of the hose with respect to the spout.

6. The mixing tap according to claim 1, wherein the operating element is an operating ring extending around the tap body.

7. The mixing tap according to claim 1, wherein the mixing tap is configured to dispense water from the water source only when the hose is in the normal position.

8. The mixing tap according to claim 1, wherein the water source is a device for dispensing very hot or boiling water, wherein the very hot or boiling water has a temperature equal to or higher than 95 degrees Celsius.

9. The mixing tap according to claim 1, wherein the water source is a device for dispensing cold water and/or cooled water.

10. The mixing tap according to claim 9, wherein the cold water and/or cooled water is filtered cold and/or filtered cooled water.

11. A system for dispensing water, comprising:
    a mixing tap according to claim 1,
    the water source for dispensing an additional type of water, and
    the water supply conduit coming from the water source and connected or intended to be connected to the connection of the mixing tap.

12. A mixing tap for dispensing water, comprising:
    a tap body having a fitting end for fitting the tap body in or on a fitting opening,
    a spout fitted in or on the tap body and provided with a dispensing end,
    a mixing device arranged in the tap body, in which the mixing device comprises a first inlet for cold water, a second inlet for hot water and an outlet for mixed water, and
    an at least partly flexible hose, in which the flexible hose comprises a first water conduit with an inflow end and an outflow end, in which the inflow end is connected to the outlet and in which the outflow end ends in a nozzle provided near the dispensing end of the spout for dispensing the mixed water,
    wherein the mixing tap has an accommodation duct which runs from the fitting end to the dispensing end for receiving at least a portion of the hose,
    wherein the hose with nozzle is displaceable with respect to the spout between a pulled-out position, in which the hose protrudes with respect to the dispensing end, and a normal position, in which the hose does not extend with respect to the dispensing end or to a lesser degree than in the pulled-out position,
    wherein the hose has a second water conduit with a second inflow end and a second outflow end, in which the second inflow end is connected to a connection for connecting a water supply conduit coming from a water source, and the second outflow end ends in the nozzle, and
    wherein the mixing tap is configured to dispense water from the water source only when the hose is in the normal position.

13. The mixing tap of claim 12, wherein the mixing tap comprises a position sensor for determining the position of the hose with respect to the spout.

14. The mixing tap according to claim 12, wherein the water source is a device for dispensing very hot or boiling water, wherein the very hot or boiling water has a temperature equal to or higher than 95 degrees Celsius.

* * * * *